United States Patent
Cremona

[11] Patent Number: 5,383,504
[45] Date of Patent: Jan. 24, 1995

[54] FLEXIBLE STATION FOR CUTTING VENEER FROM WOOD LOGS

[75] Inventor: Lorenzo Cremona, Monza, Italy

[73] Assignee: Angelo Cremona & Figlio S.p.A., Milan, Italy

[21] Appl. No.: 151,684

[22] Filed: Nov. 15, 1993

[30] Foreign Application Priority Data

Dec. 3, 1992 [IT] Italy ............... MI92 A 002765

[51] Int. Cl.⁶ .................. B27L 5/02; B27L 5/08
[52] U.S. Cl. ..................... 144/215; 83/106; 144/3 R; 144/209 R; 144/242 R; 144/365; 144/367; 144/369; 286/110
[58] Field of Search ......... 83/105, 106; 144/3 R, 144/209 R, 215, 242 R, 365, 367, 369; 242/56.5, 76; 226/109, 110

[56] References Cited
U.S. PATENT DOCUMENTS

| | | | |
|---|---|---|---|
| 1,354,464 | 10/1920 | Cameron et al. | 144/215 |
| 2,314,102 | 3/1943 | Poole | 144/215 |
| 3,107,589 | 10/1963 | Goettsch et al. | 226/109 |
| 4,007,652 | 2/1977 | Shinomiya et al. | 83/106 |
| 4,397,204 | 8/1983 | Colombo | |
| 4,726,271 | 2/1988 | McEwan | 144/356 |
| 4,809,574 | 3/1989 | Cremona | 83/371 |
| 4,838,137 | 6/1989 | Azuma | 226/110 |
| 4,934,228 | 6/1990 | Bolton et al. | 83/106 |
| 4,989,651 | 2/1991 | Snellgrove | 83/106 |

FOREIGN PATENT DOCUMENTS

| | | | |
|---|---|---|---|
| 928140 | 4/1947 | France | 144/209 R |
| 4746719 | 3/1969 | Japan | 144/215 |

*Primary Examiner*—W. Donald Bray
*Attorney, Agent, or Firm*—Keck, Mahin & Cate

[57] ABSTRACT

A veneer cutting station (10) for a wood log (12) comprises a veneer cutting machine (11) producing a continuous sheet of rotary-cut veneer sent to transverse cutting means and at least one incising blade (23) arranged for cutting longitudinally the veneer sheet in a predetermined position of its width and thus form parallel strips of veneer. Downstream of the veneer cutting machine (11) are located deflecting means (14) identifying running tables (27) for strips of veneer each towards one of a plurality of superimposed paths (15,16,20,21) and there being along each path (15,16,20,21) a cutter (18,19) for transverse cutting of the veneer.

9 Claims, 1 Drawing Sheet

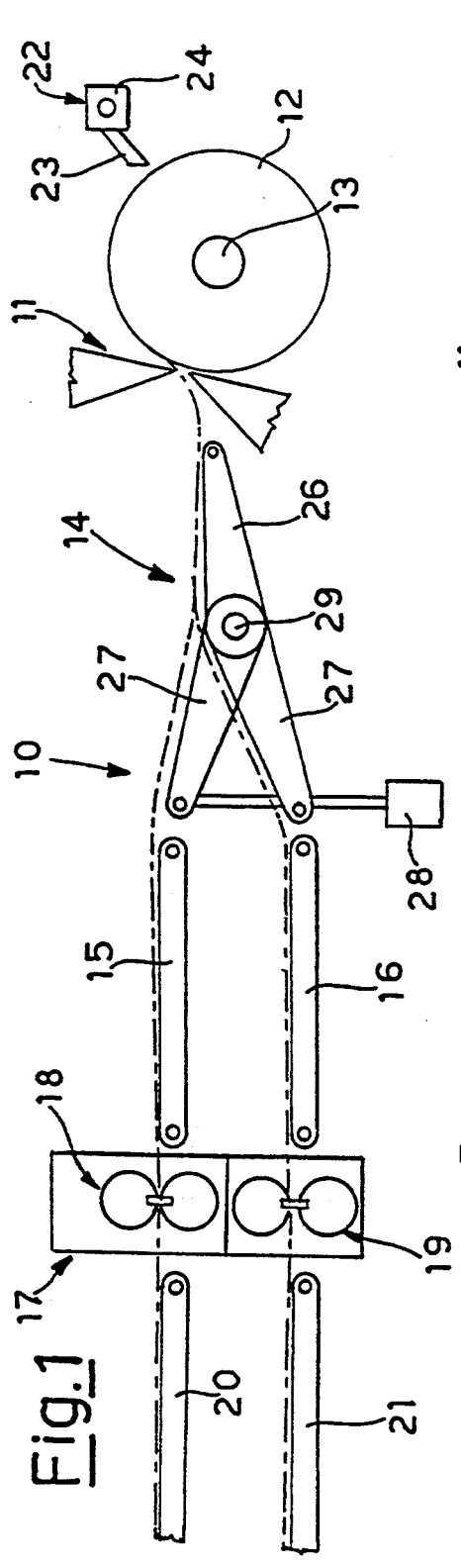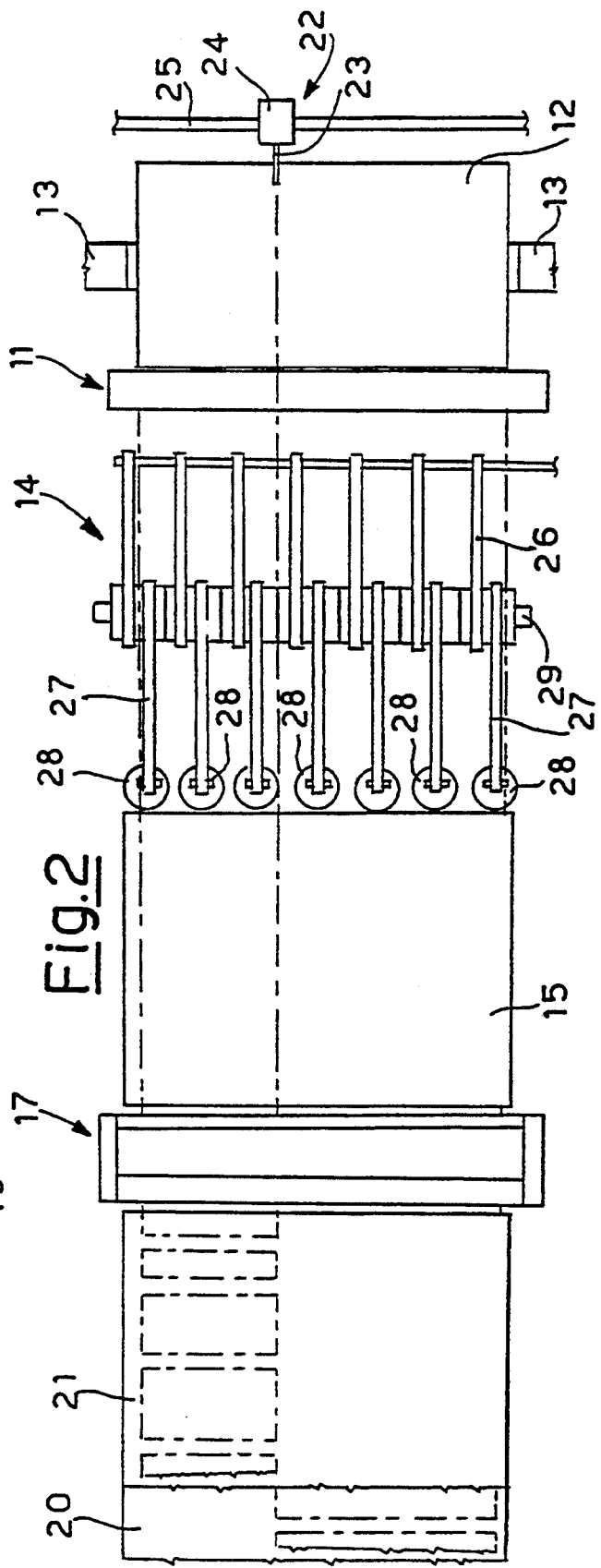

FLEXIBLE STATION FOR CUTTING VENEER FROM WOOD LOGS

BACKGROUND OF THE INVENTION

In the processing of rotary cut wood veneer very often there arises the need for a differentiated, veneer cutting of the log in axial direction.

This may happen for example because of geometrical characteristics of the log such as excessive taper or because of local defects.

There are at present veneer cutting machines having an incising blade arranged in the middle to divide the rotary-cut veneer in two parallel strips sent to a reciprocating cutter with two twin blades side by side. Each blade has a width half the maximum width of rotary-cut veneer treated so as to be able to cut the respective strip produced by the incising blade. It is thus possible to perform independent cuts in the two strips and hence optimize the transverse cuts depending on the defects appearing separately on the two strips. Such a solution is however limiting add forces cutting with the incisor only in the middle of the veneer cutting machine. There is therefore prevented a choice of where to perform the incision depending on the characteristics of the rotary-cut veneer and the position of the defects. In various situations this translates into high wood scrap. Typical is for example the case of defects near the edges of the rotary-cut veneer.

There are also problems if it is desired to change over to production of whole rotary-cut veneer sheets. In this case indeed, either the cutter must be replaced with a whole blade or devices designed to accurately synchronise the two twin blades must be provided to obtain a single cut. The first solution involves high costs and shut down times of the plant often unacceptable. The second solution involves the employment of sophisticated and costly electronic or mechanical synchronising devices which are often not entirely reliable because of among other things the high cutting speeds required.

The general purpose of the present invention is to obviate the above shortcomings by supplying a flexible veneer cutting station permitting in a simple and effective manner division of the rotary-cut veneer sheet into parallel strips of any width and treatment of undivided rotary-cut veneer sheets.

SUMMARY OF THE INVENTION

In view of said purpose it has been sought to provide in accordance with the present invention a veneer cutting station for a wood log comprising a veneer cutting machine producing a continuous sheet of rotary-cut veneer sent to transverse cutting means and characterised in that it comprises at least one incising blade arranged for cutting longitudinally the rotary-cut veneer sheet in a predetermined position of its width and thus forming parallel strips of rotary-cut veneer and downstream of the veneer cutting machine there being located deflecting meads identifying running tables for strips of rotary-cut veneer each towards one of a plurality of superimposed paths and there being along each path a cutter for transverse cutting of the veneer sheet.

BRIEF DESCRIPTION OF THE DRAWINGS

To clarify the explanation of the innovative principles of the present invention and its advantages compared with the known art there is described below with the aid of the annexed drawings a possible embodiment by way of nonlimiting example applying said principles. In the drawings:

FIG. 1 shows a diagrammatic side view of a veneer cutting station in accordance with the present invention, and FIG. 2 shows a plan view of the station of FIG. 1.

DETAILED DESCRIPTION OF THE INVENTION

With reference to the figures FIG. 1 shows schematically an innovative veneer cutting station indicated generally by reference number 10. The machine comprises a veneer cutting section substantially of the known art and comprising a blade and counter-blade 11 for cutting veneer from a log 12 rotating axially between two powered chucks 13. The rotary-cut veneer produced at the outlet of the veneer cutting machine 11 is sent to deflecting means 14 for selective feeding of two overlying conveyors 15, 16 which feed in turn a respective transverse cutter 18, 19 of a transverse cutting unit 17. Each of the cutters has a width equal to the maximum length of a log which the machine can cut veneer from. The products cut by the two cutters 18, 19 are received at the outlets of the cutting units by respective conveyors 20, 21 for sending towards the outside of the station 10, e.g. towards subsequent processing or known stacking devices.

As may be seen also in FIG. 2, the deflecting units or means are made up of a plurality of deflecting or running elements arranged mutually parallel and side by side along the direction transverse to the path of the rotary-cut veneer sheet. The number of deflectors should be sufficient to form substantially a conveyor table for the rotary-cut veneer sheet. Each deflector comprises an arm or element 27 pivoted upstream to a common axle 29 to be mobile between positions of alignment of its ends downstream alternating between the inlet of the first conveyor 15 and the inlet of the second conveyor 16. Movement between the two positions is secured by means of an actuator 28, e.g. a hydraulic piston. The deflectors can be provided for example by a fixed arm 26 leading to the mobile arm 27, fixed arm and mobile arm being belt conveyors. As an alternative there can also be used deviation flaps.

Along the path of the rotary-cut veneer sheet before reaching the deflectors is placed a blade 23 for longitudinal cutting of the rotary-cut veneer sheet. The blade is mobile in a direction parallel to the axis of the log 12 to enable setting of the position of the longitudinal cut. For example, the blade can be supported by a carriage 24 moving along a guide 25 parallel to the axis of the log. As may be seen in the Figures, the blade can cut the log immediately before the veneer cutting unit 11 makes the rotary-cut veneer sheet which in this case will be produced already in the form of two strips.

In use, the blade 23 is positioned first to divide the rotary-cut veneer sheet in two strips along a line for example optimising utilisation of the material.

It should be noted that it is not at all necessary, as occurred with the known art, that the cutting line coincide with the middle of the rotary-cut veneer sheet but the widths of the two strips can be in any reciprocal ratio.

After setting the blade 23 it is sufficient to select the deflectors on one side of the longitudinal cutting line in such a manner that they align with one of the two belts 15 or 16 and the deflectors on the other side of the longitudinal cutting line in such a manner that they align with the other belt 16 or 15. In this manner there are provided two paths, one formed by the belts 15 and 20 and the other formed by the belts 16, 21 with each path passing through its respective transverse cutter.

One strip of rotary-cut veneer is thus conducted along one of said paths while the other strip is conducted along the other. The corresponding cutters then perform in accordance with the known art and independently the transverse cuts on the two strips.

At this point it is clear that the pre-set purposes are achieved. It is clear that the width of the strip treatable by each cutter can vary continuously between zero and the total length of the log and that the widths of the strips can be in any ratio to one another. It is thus possible also to treat a full width rotary-cut veneer sheet by excluding the blade 23 and sending the whole rotary-cut veneer sheet to only one cutter.

In case of breakdown of one cutter it is also possible to use only the other with an increase in wood scrap but at least continuing processing.

Naturally the above description of an embodiment applying the innovative principles of the present invention is given merely by way of example and therefore is not to be taken as a limitation of the patent right claimed here. For example, the cutters, shown as a known rotary type, can also be separate and not necessarily part of the same cutting unit. It is also clear that it would be possible to provide veneer cutting stations with multiple longitudinal cutting blades and multiple transverse cutters so as to be able to cut the rotary-cut veneer sheet in more than two strips. In this case the deflector units would have positions aligned with each of the paths towards the various cutters.

Finally, the cutter can comprise known controllable means for scrapping of the cut products for selection thereof on the basis of their content of defects.

What is claimed is:

1. A veneer cutting station for a wood log comprises a veneer cutting machine, said machine comprising:
   a blade for producing a continuous sheet of rotary-cut veneer,
   means for cutting said sheet transversely, and
   at least one incising blade arranged for cutting the rotary-cut veneer sheet longitudinally in a predetermined position of its width to form parallel strips of rotary-cut veneer,
   wherein downstream of the veneer cutting machine said veneer cutting station further comprises:
   means for deflecting the rotary-cut veneer strips, said deflecting means comprising running tables for supporting each of said strips of rotary-cut veneer on one of a plurality of superimposed paths, and
   a cutter in each path for cutting the veneer transversely into cut strips.

2. A station as set forth in claim 1 wherein the deflecting means comprises a plurality of adjacent running table elements positioned side by side transversely to the running direction of the rotary-cut veneer sheets, the elements opposite each of the parallel strips being selectively movable and parallel to each other to form said running tables.

3. A station as set forth in claim 2 wherein each of the plurality of adjacent running table elements is pivoted at a first end toward the veneer cutting machine and is connected to handling means for said sheets and is directed with a second end selectively opposite a beginning of one of the paths.

4. A station as set forth in claim 2 wherein each running table element comprises a strap conveyor.

5. A station as set forth in claim 2 wherein each running table element is preceded by a strap conveyor with its inlet end toward the veneer cutting machine.

6. A station as set forth in claim 3 wherein the pivoted running table elements are pivoted on a common axis.

7. A station as set forth in claim 1 wherein the incising blade is supported by a carriage which is movable in a direction parallel to a length of the log for moving said blade to said predetermined position.

8. A station as set forth in claim 1 wherein the incising blade is set to divide the rotary-cut veneer sheet into two strips, each strip being sent by the deflecting means to one of two superimposed paths.

9. A station as set forth in claim 1 wherein each path comprises a first conveyor between the deflecting means and an inlet of the corresponding cutter and a second conveyor for withdrawing said cut strips at an outlet of the said corresponding cutter.

* * * * *